Aug. 10, 1926.
N. A. NEWDICK
1,595,566
CONVEYER
Filed Dec. 11, 1922    3 Sheets-Sheet 2
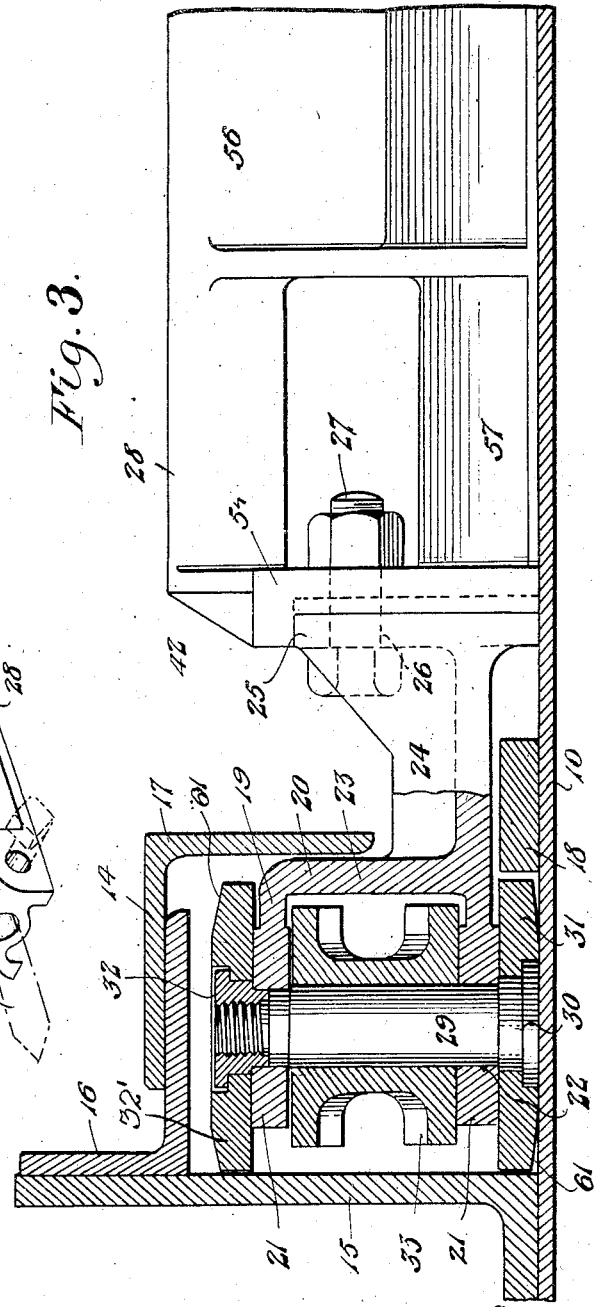
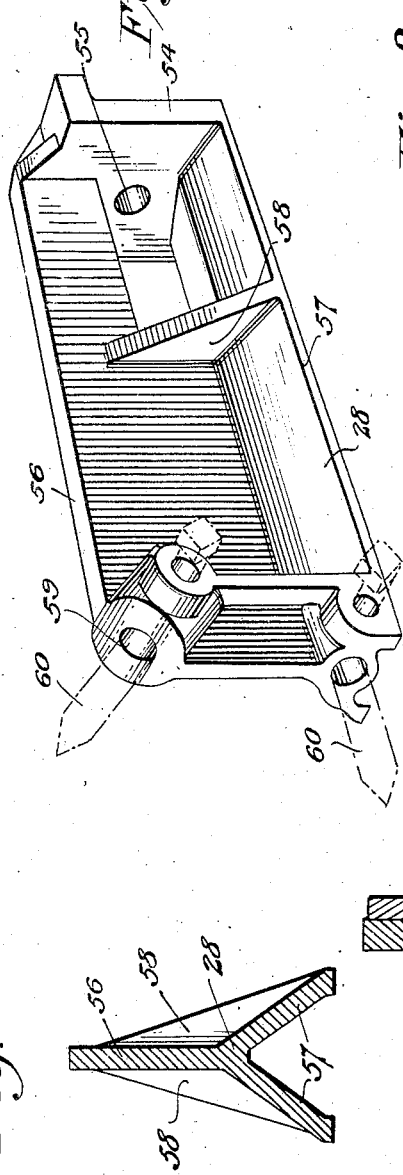
Inventor
Norton A. Newdick
By W. S. McDowell
Attorney Aug. 10, 1926.
N. A. NEWDICK
1,595,566
CONVEYER
Filed Dec. 11, 1922    3 Sheets-Sheet 3
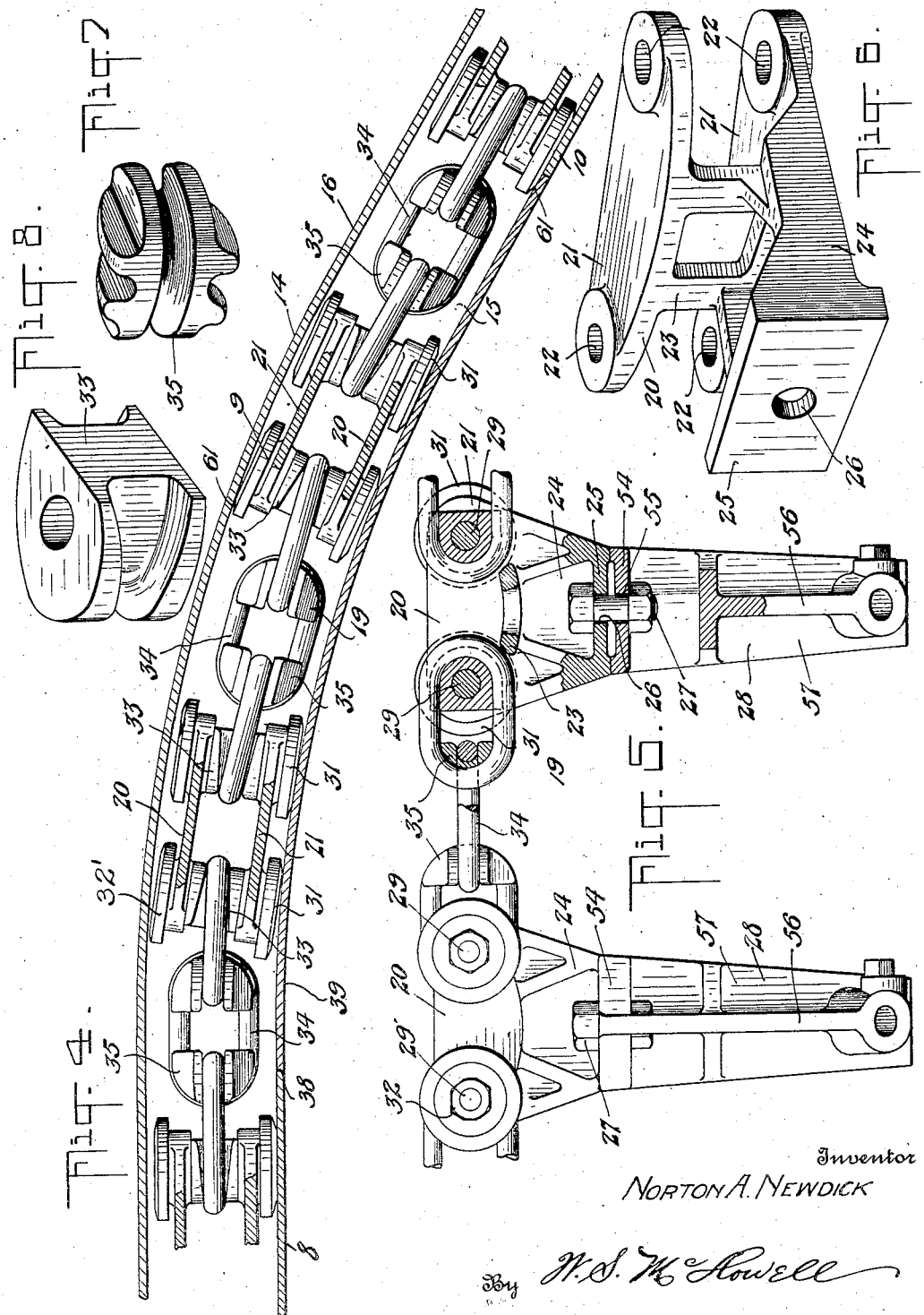
Inventor
NORTON A. NEWDICK
By W. S. M. Howell
Attorney Patented Aug. 10, 1926.

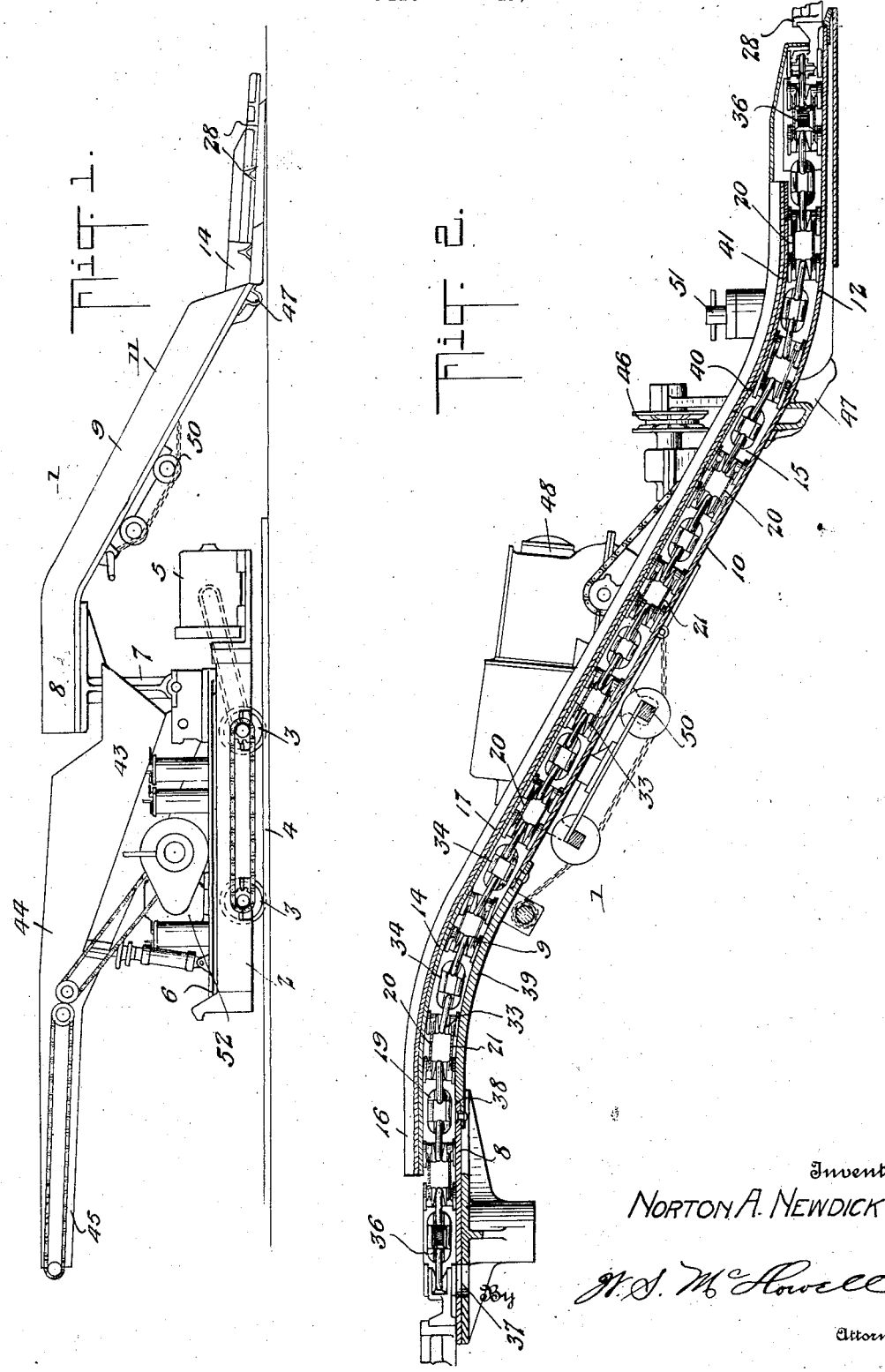

1,595,566

UNITED STATES PATENT OFFICE.

NORTON A. NEWDICK, OF COLUMBUS, OHIO, ASSIGNOR TO THE COLODER COMPANY, OF COLUMBUS, OHIO, A CORPORATION OF DELAWARE.

CONVEYER.

Application filed December 11, 1922. Serial No. 606,238.

This invention relates to improvements in conveyers, and is especially directed to conveyers of the type employed in connection with loading machines of a character adapted for the loading of coal or other loose materials.

In accordance with the invention there is provided a loading machine formed to include an elongated inclined conveyer having substantially flat horizontally extending upper and lower extremities, the upper or rear extremity of said conveyer being pivotally mounted so that the said conveyer may swing horizontally back and forth across the floor of a mine or other surface, with the forward extremity of said conveyer in engagement with the floor and the said conveyer being provided with an endless belt of improved construction, and having projecting laterally therefrom a plurality of flights, which upon the operation of the belt are advanced toward and into engagement with the materials to be loaded, drawing such materials upon and advancing the same longitudinally through either one side or the other of the conveyer and discharging the same from the elevated end of the conveyer into other suitable means for removal to appropriate points of discharge.
Among the objects of the invention are to provide: A gathering conveyer of the character aforesaid wherein the endless belt thereof is constructed to possess exceptional strength, durability, and wearing qualities so as to be capable of successfully withstanding the stress and wear imposed thereon by the laterally projecting flights and the materials engaged and advanced thereby; in constructing the belt for travel in longitudinal guides formed in connection with the conveyer and in flexibly uniting the various units of the belt so that the latter may be adapted to the configuration of the guides and the vertical bends therein; in forming the belt so that the latter may properly mesh with and pass around drive sprockets situated at the ends of the guides; in forming the belt to include rollers or other ample friction means for the purpose of minimizing friction between said belt and the guides through which it passes, and in the provision of various other improvements to be hereinafter more fully described and pointed out.

In the accompanying drawings, forming a part of this specification, and in which similar characters of reference denote like and corresponding parts, throughout the several views thereof:

Figure 1 is a side elevation of a loading machine provided with the improved conveying means comprising the present invention.

Figure 2 is an enlarged vertical sectional view taken through the gathering conveyer of the loading machine and disclosing more particularly the construction and arrangement of the endless belt comprising the present invention.

Figure 3 is a vertical transverse sectional view taken through the belt, the guide through which it moves, and associated flight construction.

Figure 4 is a vertical sectional view taken through the belt and disclosing more particularly the action of the belt in passing around one of the vertical bends in the guide therefor.

Figure 5 is a plan view partly in section, of the belt and co-operative flights.

Figure 6 is a detailed perspective view of one of the flight anchoring blocks of the belt.

Figure 7 is a perspective view of the wear blocks employed in the uniting of the ring links of the belt.

Figure 8 is a detailed perspective view of one of the wear blocks employed in the uniting of the end ring links of the belt with the flight anchoring blocks.

Figure 9 is a perspective view of one of the flights of the belt.

Figure 10 is a vertical transverse sectional view taken through one of the flights.

Referring more particularly to the specific details of the invention, the numeral 1 designates a loading machine of the type particularly disclosed and claimed in my co-pending application, Serial No. 439,092, filed January 22, 1921, and which type of machine has been selected to more completely illustrate the present invention, although it will be understood, as the description proceeds, that the invention may be embodied in loading machines of other types or may be used in connection with conveying structures other than loading machines. However, for present purposes the machine 1 may be broadly described as consisting of a truck 2 provided with wheels 3, and arranged to travel upon a track-way 4, a motor 5 being mounted upon the forward end of the truck for imparting power to the wheels 3, so that the machine may operate under its own power over the track-way 4. Pivotally supported upon the truck is a bed plate 6, which carries a vertically arranged supporting member 7, upon which is mounted the elevated horizontally extending rear end 8 of a gathering conveyer 9.

This conveyer consists of a structural sheet metal frame formed to include a bottom 10 and upstanding sides 11, the lower end of the bottom terminating in a flat depressed nose extension 12, which is adapted to rest upon the floor of a mine at a position in advance of the truck 2, whereby upon swinging the conveyer 9 bodily in a horizontal plane about the vertical pivot provided by the member 7, the nose extremity 12 of said conveyer will be caused to sweep the floor and to be thereby maintained in engagement with materials to be loaded over a range afforded by the length of the conveyer 9.

Provided upon the bottom 10 of the frame 13 of the conveyer is a pair of chain guides 14, the construction of which being disclosed specifically in Figure 3, wherein it will be noted that the guides include a main angle bar 15, positioned upon and rigidly secured to the bottom 10. To the upper edge of the vertical leg of the angle bar 15 there is attached a lighter angle bar 16, which has its horizontal leg arranged to project laterally and outwardly from the bar 15 in a plane appreciably spaced from and above the bottom 10. To the horizontal leg of the angle bar 16 there is secured the horizontal leg of a third angle bar 17, which latter has its vertical leg arranged in depending relation from the bar 16, and spaced outwardly and transversely from the main angle bar 15, the vertical leg of the angle bar 17 being terminated in spaced relation from the bottom 10, to provide a continuous slot in the guides 14 as a whole. Also, the guides include a flat metallic strip 18, which is secured upon the upper surface of the bottom 10 and is located immediately beneath the lower terminating edge of the vertical leg of the angle bar 17. These angle bars in combination with the strip 18 provide a rectangular enclosure through which is adapted to pass the opposite runs of an endless conveying belt 19, comprising a salient part of the present invention.

The belt 19 is mounted for travel through the guides 14 and is arranged to rest upon the upper surface of the bottom 10, and by being thus located it will be apparent that the going and return runs of the belt will be located in corresponding planes. In its use in connection with loading machines, particularly those of the type adapted for coal mining purposes, the belt 19 when in operation is subjected to high pressures, strains, and other forces which tend to either break the component units of the belt or to bring about rapid deterioration thereof by wear and other influences. To provide a substantial and durable construction I form the belt 19 to include a plurality of flight anchoring blocks 20, shown in detail in Figure 6. Each of these blocks is formed to comprise upper and lower bars 21, provided with registering openings 22 in the opposite ends thereof, the said bars being united by means of an apertured vertical web 23. Projecting laterally and outwardly from the lower of the bars 21 is a ribbed extension 24, which terminates in an upstanding vertical flight attaching wall 25, which is pierced as at 26 for the reception of a bolt 27 utilized in detachably connecting with the block 20 a laterally extending flight or conveying arm 28. In practice the bolt 27 is of a frangible character, so that in the event of the flight 28 engaging with more or less fixed obstructions excessive strains on the belt 19 will be relieved by the fracturing of the bolt 27 and the consequent release of the flight 28 under strains.

Arranged to pass through the openings 22 in the ends of the bars 21 are bolts 29, which have their lower ends headed as at 30, around which are rotatably mounted flat disc rollers 31, which engage with the bottom 10. The upper ends of the bolts 29 are threaded and extend above the upper of the bars 21 for the reception of shouldered nuts 32, which act to rotatably receive flat disc shaped rollers 32' corresponding to the rollers 31, the rollers 32' being so positioned as to engage with the sides of the guides 14. Between the bars 21 and surrounding the bolts 29 are wear blocks 33, which receive the end of the ring links 34 which flexibly unite adjoining arranged blocks 20. The links 34 are preferably three in number, and preferably wear blocks 35 are situated between the adjoining ends of the middle of the links 34 and the end links thereof.

It will be noted that by this construction a uniform pitch distance will be maintained between the intermediate of the links 34 and the spaces provided in the anchor blocks 20 midway between the bolts 29, whereby through the medium of this construction the belt will be enabled to pass around drive and guide sprockets 36, located at the opposite longitudinal ends of the guides 14. Thus not only does the chain belt possess an exceptionally strong and rugged construction, but it lends itself properly to the tooth construction of the sprockets 36, so that power may be properly and effectively applied to said belt to promote its operation. Furthermore, it will be observed by reference to Figure 4 that the ring links are of a length that bear such relation to the vertical curvature of the conveyer frame that enables the said links to float between the adjacent anchor blocks without contacting with either the bottom 10 of the frame 13 or the angle bar 16. By this construction wear on the intermediate ring links is precluded because of the fact that the said links do not engage with stationary surfaces in the guides.

By the construction described it will be manifest that a substantial belt construction for the purpose specified is provided, and a conveyer construction is produced which is characterized by its long life and freedom from mechanical disorder. In the event, however, that a break does occur in the belt, the said break can be readily corrected by the construction of the anchor blocks, since by the removal of the nuts 32 the bolts 29 can be readily withdrawn to permit of the disassembling of the chain or belt at any point in its length. To facilitate the removal of the bolts 29 the bottom 10 is provided with openings 37 to permit of the ready withdrawal of said bolts through the bottom of the frame 13, the openings 37 being preferably located around the drive sprocket situated at the elevated end of the frame.

Another important feature resides in cutting away the bottom 10 as at 38 at the upper bend of the frame to receive a removable wear plate 39, which plate is positioned to receive the wear which would be ordinarily imparted to the frame by the action of the belt in flexing vertically around the upper bend. It will be apparent that in the event that the wear plate 39 becomes excessively worn, the same may be removed and a new plate substituted in lieu thereof. This avoids the replacement of an entirely new frame or pan. Similarly, the angle bars 16 at the lower end of the frame, or where the frame merges into the nose extension 12 are cut-away as at 40, for the reception of renewable wear plates 41.

It will be observed that the flights 28 project laterally from the chain boxes or guides 14, and are adapted to operate through suitable material conveying ways 42 provided in said frame 13 between the guides and the sides 11 of said frame. Manifestly, upon movement of the belt 19 the flights will be caused to travel around the foot or nose sprocket on the extension 12 and immediately adjacent to the floor surface. This path of movement enables the flights to be brought into engagement with the materials to be loaded so as to draw or advance said materials into and through the ways 42, which latter are alternately available in accordance with the direction of movement of the reversible belt 19. The construction of the conveyer enables the materials to be removed from the floor and elevated to an appropriate height, which is determined by the horizontal plane of the end 8.

In the present instance, materials are discharged from the end 8 into the flaring walled hopper 43 of a delivery conveyer 44. This conveyer is mounted upon the bed plate 6, and since the pivot of the bed plate is co-incident with the vertical pivot 7 of the gathering conveyer, it follows that the discharge end of the gathering conveyer and the receiving end of the delivery conveyer will be in constant registration irrespective of the relative angular positions which the two conveyers may assume with respect to each other during the operation of the machine. The delivery conveyer terminates in an elevated discharge end 45 which overhangs the truck 2, and is constructed to permit of the positioning of a mine or pit car therebeneath, so that materials handled by the machine may be directly discharged into such cars for removal from the mine. Two conveyers provide a loading machine of extreme flexibility, and enable the same to operate on curved tracks from a relatively stationary base.

It will be understood that the gathering conveyer is mounted to swing bodily horizontally about the vertical pivot provided by the supporting member 7, so that the gathering or receiving end thereof may be kept in engagement with the work. To swing the frame of the gathering conveyer laterally there is provided thereon a pocketed sheave wheel 46, the pockets of which are received by a chain, which is trained through hawse guides 47 provided in connection with the frame 13, and has its outer ends adapted for connection with a lateral anchorage. The wheel 46 is rotated by a motor 48, and power devices are situated between the motor 48 and said sheave wheel to rotate the latter at appropriate speeds and with requisite power. Manifestly, upon the rotation of said motor, the gathering conveyer may be swung from one side of the track-way 4 to the other.

When the machine is being transported over a track-way from one working location to another, a pony truck 50 is placed beneath the forward end thereof and pivotally united therewith by means of a king bolt 51. When the machine is loading the pony truck is suspended beneath the frame as shown in Figure 1. The bed plate 6 carries an operating motor 52 which, through the agency of suitable power transmitting devices (not shown) serves to operate the belts of the gathering and delivering conveyers.

The flights 28 are of peculiar construction and in this instance are in the form of an integral steel casting, the same being formed to include a vertical wall 54, which registers with the wall 25 on the blocks 20, and is provided with an opening 55 for the reception of the frangible bolts 27 integrally formed with the wall 54 and extending laterally and at right angles thereto, is a vertical conveying web 56, shown more particularly in Figures 9 and 10, and this web terminates at its lower edge in downwardly and outwardly inclined surfaces 57, which are adapted to be forced into and under the materials gathered, so that the flights may advance a maximum quantity of such materials at each operation, and at the same time to offer but a minimum of resistance to the operation of the belt 19.

It will be noted that the surfaces 57 in connection with the web 56 provides in each flight a pocket 58 which possesses a carrying capacity exceeding the ordinary straight walled flight, by producing a greater degree of frictional drag on the materials loaded, and at the same time minimizing the resistance which the flights meet with when initially engaging the work. The extreme outer ends of the flights may be provided with bit sockets 59 in which bits 60 may be provided, if desired, when the machine 1 is engaged in coal loading operations.

In view of the foregoing it will be seen that the present invention provides in a loading machine or other conveying mechanism an endless conveyer belt of exceptional strength and durability, one that is able to withstand the high pressures and the complex strains and stresses incident to, for example, the loading of coal or other heavy materials. The chain is constructed so as to be conveniently flexible and constantly responsive to changes in the line of travel of the guides 14 and to the peripheries of the sprockets 36, and furthermore embodying anti-friction means for facilitating the passage of such a relatively heavy belt through said guides. The rollers 31 and 32' have their outer peripheral edges chambered as at 61 so that the same are properly adapted to the vertical curvature of the frame 13, as shown particularly in Figure 4. This construction enables the rollers to rotate freely within said guides without wedging. The chain may be readily assembled or disassembled, making repairs quick and simple to make.

It will be noted that when the flights 28 are advancing materials upwardly through either one or the other of the inclined ways 42, of the conveyer 9, the load on said flights tends to twist the same, and this action is taken care of readily by the rollers 31 and 32', which engage with the angle bars 15 and 17 and the strip 18. The load sustained by the flights is borne through the conveyer by a rollered belt, a construction which assures but a minimum of friction.

What is claimed is:

1. In a loading machine, an elongated inclined conveyer including a frame, chain guides provided on said frame, a flexible transmission chain arranged to pass through said guides, laterally extending flights carried by said chain, and renewable wear strips provided in connection with said chain guides.

2. In a loading machine, an elongated inclined conveyer terminating at its upper and lower ends in horizontal extensions, chain guides carried by said frame and conforming to the contour thereof, an endless transmission chain arranged to travel through said guides, and renewable wear plates formed in connection with said guides and situated at the junctures of the inclined portions of said frame with the horizontal terminating portions thereof.

3. In a loading machine, a conveyer comprising an endless transmission chain composed of a plurality of flight links, chain links flexibly uniting said flight links, integral lateral extensions projecting from said flight links, said extensions each terminating outwardly in a vertical wall, a flight including a vertical wall arranged for co-operation with the vertical wall of said extension, and securing means passing through said walls to unite said flights with said chain.

4. In a conveyer, a flight formed to comprise an integral metallic body, including a substantially vertically disposed web, downwardly and outwardly inclined walls provided at the lower edge of said web, and serving to produce a material receiving pocket, and means provided at the inner ends of said flights for securing the latter to a conveyer.

In testimony whereof I have signed my name to this specification.

NORTON A. NEWDICK.